J. K. MILLER.
TRACTOR HITCH.
APPLICATION FILED JUNE 12, 1920.
1,361,166.
Patented Dec. 7, 1920.
2 SHEETS—SHEET 1.
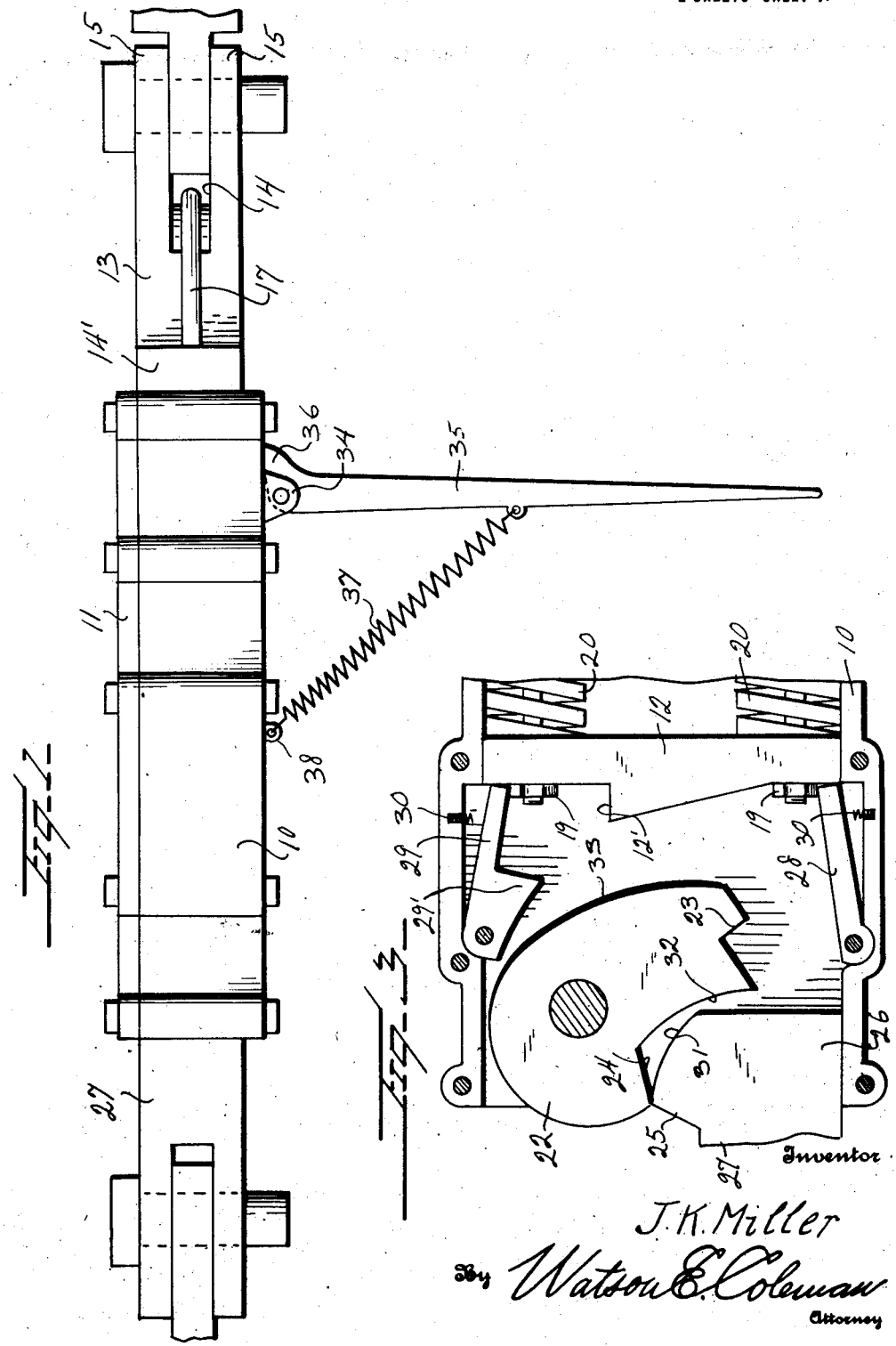
Inventor
J. K. Miller
By Watson E. Coleman
Attorney

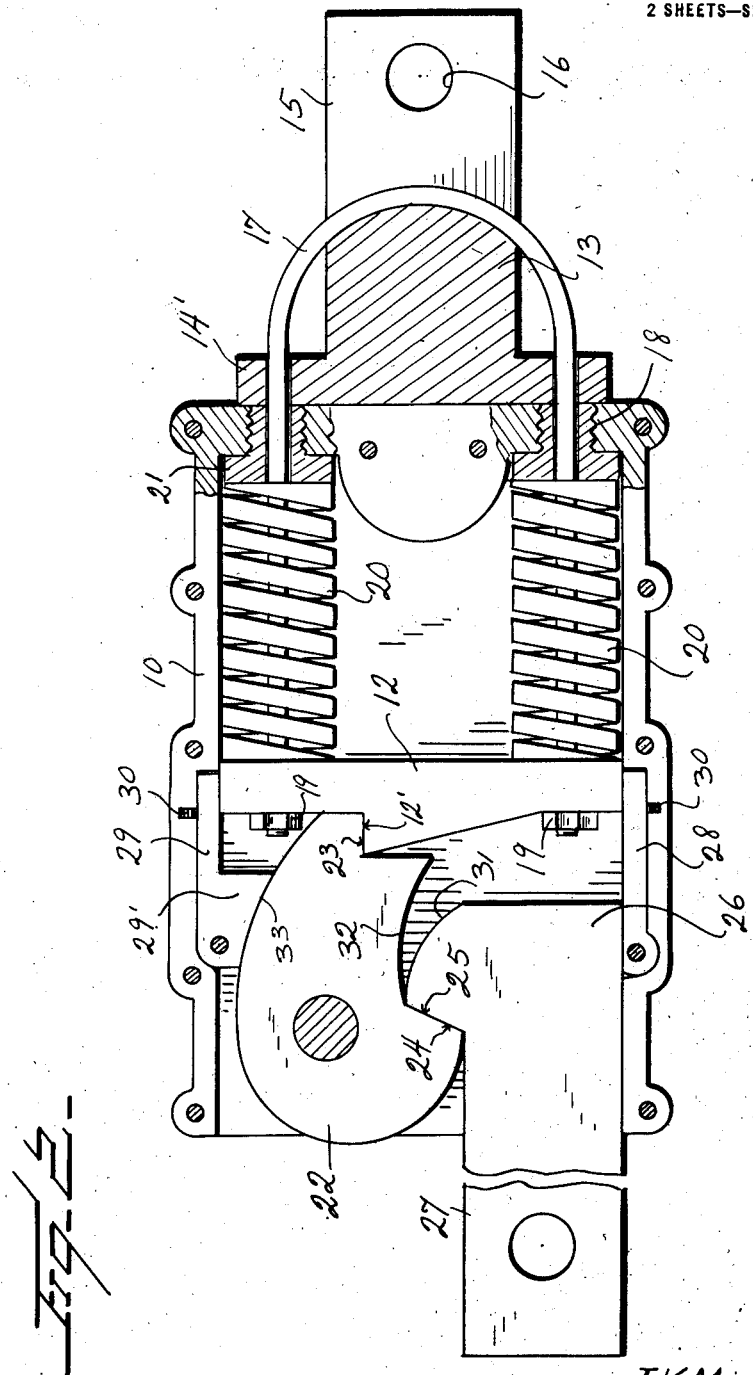

UNITED STATES PATENT OFFICE.

JOHN K. MILLER, OF MARSHALL, MINNESOTA.

TRACTOR-HITCH.

1,361,166.  Specification of Letters Patent.  Patented Dec. 7, 1920.

Application filed June 12, 1920. Serial No. 388,441.

*To all whom it may concern:*

Be it known that I, JOHN K. MILLER, a citizen of the United States, residing at Marshall, in the county of Lyon and State of Minnesota, have invented certain new and useful Improvements in Tractor-Hitches, of which the following is a specification, reference being had to the accompanying drawings.

This invention relates to tractor hitches and has for an object the provision of a device which will automatically and efficiently release a drawn implement from the tractor, or the like, when the drawn implement comes into contact with some fixed object which might cause breakage thereof.

A further object of the invention is to provide a device of the above character having a highly efficient trip release.

A further object of the invention is to provide a device of the above character wherein the recoupling of the tractor or other draft implement with the drawn implement may be accomplished with a minimum expenditure of labor and loss of time.

A further object of the invention is to provide a novel support for the draft bars of a tractor or agricultural implement whereby the same may be held in elevated position when the tractor or implement is moved in one direction, said support being automatically elevated from contact with the ground when the tractor or implement is moved in the opposite direction.

Other objects and advantages of the invention will become apparent throughout the course of the following description.

In the accompanying drawings, wherein for the purpose of illustration is shown a preferred embodiment of my invention, and wherein like numerals designate like parts throughout:

Figure 1 is a side elevation of my hitch showing my improved stake attached thereto.

Fig. 2 is a plan view of my hitch, the cover plate being removed and portions being shown in section for the purpose of illustration.

Fig. 3 is an enlarged detail view showing the position of the several parts when the draw bar is released.

Referring now more particularly to the drawings, the numeral 10 indicates a suitable casing having an open top and open rear end, the top being closed by suitable covering plate 11 held in position by any desired securing means.

A plate 12 extends transversely of the casing 10 and is mounted for reciprocation longitudinally of the casing. Mounted adjacent the forward end, slotted as at 14 for the reception of the tractor draw bar, the slot 14 forming spaced arms 15 provided with apertures 16, through which a coupling pin of any desired type may be inserted.

A U-shaped bar 17 is provided having the base of the U disposed within the slot 14 and the arms thereof extending through suitable openings formed in flanges 14' integral with and extending outwardly from the sides of the rear end of the member 13. The forward end of the casing 10 is provided with openings 18 in which the arms of the U are slidably mounted and the extreme rear ends of the arms extend through the plate 12 and are threaded for the reception of retaining nuts 19 or the like. Disposed intermediate the forward end wall of the casing 10 and the plate 12 are compression springs 20, the compression of which may be adjusted by means of the nuts 21 having threaded engagement with the arms of the U 17 and bearing against the forward ends of the springs 20.

Within the casing 10 adjacent the rear end thereof is pivotally mounted a trip latch 22 which embodies a shoulder 23 adapted to engage against a shoulder 12' projecting rearwardly from the rear face of the plate 12. The trip latch 22 is likewise provided with an angular shoulder 24 which is adapted to receive the rear face 25 of a head 26 formed upon a draw bar coupling member 27 which is provided at its rear end with means whereby it may be attached to the draw bar of the drawn implement. Pivotally mounted in the casing 10 are dogs 28 and 29 which are actuated by springs 30 mounted in recesses formed in the casing wall.

In the operation of my tractor hitch the bar 13 is secured to the draw bar of the tractor and the bar 27 to the draw bar of the cultivator or other implement which is to be drawn. If, in the forward movement of the tractor the cultivator comes in contact with some solid substance, as for example, a stump or stone, the movement of the cultivator being checked, the springs 20 are compressed by the pull of the tractor and the plate 12 moves forward releasing the shoulder 12' from the shoulders 23 of the trip latch allowing the bar 27 to withdraw. As the plate is moved forwardly the spring dogs 28 and 29 move inwardly and engage the plates to hold the same in the forward position with the springs compressed. Preferably some means are provided for limiting the outward spring of the spring dogs 28 and 29. In the present construction, however, the nuts 19 which engage the ends of the arms of the U perform this function. When it is desired to recouple, the tractor is backed into position and the cam face 31 of the head of the bar 27 engages the cam face 32 of the trip latch moving the trip latch to elevated position to receive the shoulder 12' against the shoulder 23. As the trip latch 22 and bar 25 arrive at the proper positions the rear face 33 of the trip latch engages the projection 29' of the spring dog 29, moving the same outwardly to the side of the bar 27 next adjacent the casing similarly engaging the spring dog 28. It will be obvious that these dogs are moved outwardly to the position shown in the drawings and the plate 12' released for movement. It will therefore be seen that the insertion of the bar 27 in the case retracts the dogs and positions the trip latch for engagement.

In order to hold the tractor hitch in elevated position so that it may properly aline with the draw bar of the cultivator to which it is to be attached, there is provided upon the underside of the casing 10, downwardly projecting spaced ears 34, intermediate which is pivotally mounted one end of a supporting stake 35. This end of the supporting stake is provided with a shoulder 36 and the stake has secured thereto intermediate its ends a spring 37 which is secured to the casing 10 at a point rearwardly of the spaced ears 34 as at 38.

It will be obvious that if the stake 35 is moved downwardly by pressure of the hand to engage the ground that the shoulder 36 coming into engagement with the bottom of the casing prevents the stake from moving forwardly beyond the vertical position and that, consequently, if the tractor is backed the stake 35 will hold the case 10 in elevated position. When the tractor is moved forwardly the stake 35 being free to move is drawn upwardly by the spring 37 into position against the bottom of the casing 10. It will be obvious that the structure last described is capable of general application to the draw bars of agricultural implements of all types.

As many changes are possible in the shape, size and arrangement of the various parts herein shown, I do not limit myself to the particular construction or arrangement hereinbefore set forth, but may make any such changes without departing from the spirit of the invention or the scope of the sub-joined claims.

Having now described my invention, what I claim is:

1. In a tractor hitch, a member mounted for oscillation, an attaching bar arranged adjacent said member and adapted to be released for movement in one direction when the member is oscillated, a plate normally holding said member to prevent oscillation thereof, means for automatically withdrawing said plate when the hitch is subjected to a predetermined strain, holding means released by the withdrawal of said plate for holding said plate in withdrawn position, and means for withdrawing said holding means.

2. In a tractor hitch, a member mounted for oscillation, an attaching bar arranged adjacent said member and adapted to be released for movement in one direction when the member is oscillated, a plate normally holding said member to prevent oscillation thereof, means for automatically withdrawing said plate when the hitch is subjected to a predetermined strain, holding means released by the withdrawal of said plate for holding said plate in withdrawn position, and means actuated by the movement of the said bar in the opposite direction for returning said member to normal position and withdrawing said holding means.

3. In a tractor hitch, a member mounted for oscillation, an attaching bar arranged adjacent said member and held against movement in one direction thereby, a withdrawable spring pressed plate normally holding said member to prevent oscillation thereof, said plate when withdrawn releasing said member for oscillation, holding means operable independently of said member released by the withdrawal of said plate for holding said plate in withdrawn position, the oscillation of said member permitting the withdrawal of said bar, means actuated by the return of said bar to normal position for returning said member to normal position for reëngagement by said plate, and means actuated by the return of said member to normal position for withdrawing said holding means and releasing said plate to reëngage said member.

4. In a tractor hitch, a casing, a member mounted for oscillation adjacent the rear end of said casing, an attaching bar slidably mounted in said casing and held against rearward movement by said member and released for rearward movement when the member is oscillated, a withdrawable plate transversely arranged within said casing and reciprocable longitudinally thereof and adapted to normally engage said member to prevent oscillation thereof, means operable independently of said member and released by the withdrawal of said plate for holding said plate in withdrawn position, the insertion of said bar within said casing being adapted to position said member for engagement by said plate and to withdraw said holding means.

5. In a tractor hitch, a casing, a trip latch mounted for oscillation therein and embodying a shoulder, an attaching bar arranged adjacent said trip latch and provided with a head normally engaging said shoulder, a second shoulder formed on said trip latch, a withdrawable plate mounted within said casing and reciprocable longitudinally thereof having a portion engaging against the shoulder of said trip latch to prevent oscillation of said trip latch, holding means operable independently of said latch released by the withdrawal of said plate for holding said plate in withdrawn position, the oscillation of said trip latch permitting the withdrawal of said bar from said casing, and means actuated by the insertion of the bar within the casing for re-positioning said trip latch for engagement with said plate and for withdrawing said holding means.

6. In a tractor hitch, a member mounted for oscillation, an attaching bar arranged adjacent said member and held against movement in one direction thereby, a spring pressed plate normally holding said member to prevent oscillation thereof, means for automatically withdrawing said plate to release said member for oscillation when the hitch is subjected to predetermined strain, holding means released by the withdrawal of said plate for holding said plate in withdrawn position, the oscillation of said member permitting the withdrawal of said bar, means actuated by the return of said bar to normal position for returning said member to normal position for reëngagement by said plate, and means actuated by the return of said member to normal position for withdrawing said holding means and releasing said plate to reëngage said member.

7. In a tractor hitch, a casing, a member mounted for oscillation adjacent the rear end of said casing, an attaching bar slidably mounted in said casing and held against rearward movement by said member and released for rearward movement when the member is oscillated, a plate transversely arranged within said casing and reciprocable longitudinally thereof and adapted to normally engage said member to prevent oscillation thereof, means for automatically withdrawing said plate from engagement with said member, when the hitch is subjected to a predetermined strain, means released by the withdrawal of said plate for holding said plate in withdrawn position, the insertion of said bar within said casing being adapted to position said member for engagement by said plate and to withdraw said holding means.

8. In a tractor hitch, a casing, a trip latch mounted for oscillation therein and embodying a shoulder, an attaching bar arranged adjacent said trip latch and provided with a head normally engaging said shoulder, a second shoulder formed on said trip latch, a plate mounted within said casing and reciprocable longitudinally thereof having a portion engaging against the shoulder of said trip latch to prevent oscillation of said trip latch, means for automatically withdrawing said plate when the hitch is subjected to a predetermined strain, means for returning said plate to normal position, holding means released by the withdrawal of said plate for holding said plate in withdrawn position, the oscillation of said trip latch permitting the withdrawal of said bar from said casing, and means actuated by the insertion of the bar within the casing for re-positioning said trip latch for engagement with said plate and for withdrawing said holding means.

9. In a tractor hitch, a member mounted for oscillation, an attaching bar arranged adjacent said member and adapted to be moved in one direction when the member is oscillated, a withdrawable plate normally holding said member to prevent oscillation thereof, holding means released by the withdrawal of said plate and operable independently of said member for holding said plate in withdrawn position and means for withdrawing said holding means.

10. In a tractor hitch, a member mounted for oscillation, an attaching bar arranged adjacent said member and adapted to be moved from one direction when the member is oscillated, a withdrawable plate normally holding said member to prevent oscillation thereof, the withdrawal of said plate permitting oscillation of said member and the release of said attaching bar, and holding means released by the withdrawal of said plate for holding said plate in withdrawn position, said attaching bar upon return to normal position returning said member to position for engagement by said plate, said member in its return to normal position engaging said holding means and withdrawing the same from its engagement with said plate to permit return of the plate to normal position.

11. In a tractor hitch, a member mounted for oscillation, an attaching bar arranged adjacent said member and adapted to be moved in one direction when the member is oscillated, a plate normally holding said member to prevent oscillation thereof, means for withdrawing said plate, holding means released by the withdrawal of said plate and operable independently of said member for holding said plate in withdrawn position and means for withdrawing said holding means, said means for withdrawing said plate being actuated automatically when the hitch is subjected to a predetermined strain.

12. In a tractor hitch, a member mounted for oscillation, an attaching bar arranged adjacent said member and adapted to be moved from one direction when the member is oscillated, a plate normally holding said member to prevent oscillation thereof, means for withdrawing said plate to permit oscillation of said member and the release of said attaching bar and two part holding means released by the withdrawal of said plate for holding said plate in withdrawn position, said attaching bar upon return to normal position returning said member to position for engagement by said plate, said member in its return to normal position engaging one part of said two part holding means and withdrawing the same from its engagement with said plate and means for withdrawing the other part of said two part holding means to permit return of the plate to normal position, said means for withdrawing said plate being actuated automatically when the hitch is subjected to a predetermined strain.

13. In a tractor hitch, a member mounted for oscillation, an attaching bar arranged adjacent said member and held against movement in one direction thereby, a withdrawable spring pressed plate normally holding said member to prevent oscillation thereof, said plate when withdrawn releasing said member for oscillation, holding means released by the withdrawal of said plate for holding said plate in withdrawn position, the oscillation of said member permitting the withdrawal of said bar, said bar upon its return to normal position returning said member to normal position for reëngagement by said plate and engaging said holding means to withdraw the same and release said plate to reëngage said member.

14. In a tractor hitch, a member mounted for oscillation, an attaching bar arranged adjacent said member and held against movement in one direction thereby, a withdrawable spring pressed plate normally holding said member to prevent oscillation thereof, said plate when withdrawn releasing said member for oscillation, holding means operable independently of said member released by the withdrawal of said plate for holding said plate in withdrawn position, the oscillation of said member permitting the withdrawal of said bar, said bar during its return to normal position engaging said member and returning the same to normal position and engaging said holding means and withdrawing the same to permit the return of said plate to normal position.

15. In a tractor hitch, a member mounted for oscillation, an attaching bar arranged adjacent said member and held against movement in one direction thereby, a spring pressed plate normally holding said member to prevent oscillation thereof, means for automatically withdrawing said plate to release said member for oscillation when the hitch is subjected to a predetermined strain, holding means operable independently of said member released by the withdrawal of said plate for holding said plate in withdrawn position, the oscillation of said member permitting the withdrawal of said bar, said bar during its return to normal position engaging said member and returning the same to normal position for reëngagement by said plate, said member and bar during their return to normal position engaging said holding means and withdrawing the same from engagement with said plate to permit the return of the plate to normal position.

16. In a tractor hitch, a casing, a trip latch mounted for oscillation therein and embodying a shoulder, an attaching bar arranged adjacent said trip latch and provided with a head normally engaging said shoulder, a second shoulder formed on said trip latch, a withdrawable spring pressed plate mounted within said casing and reciprocable longitudinally thereof and embodying a portion engaging against the shoulder of said trip latch to prevent oscillation thereof, means for returning said plate to normal position, a pair of spring dogs pivotally connected to said casing adjacent the ends of said plate and released by the withdrawal of the plate to swing into the path of and prevent the return of said plate, the oscillation of said trip latch permitting the withdrawal of said bar from said casing, said bar upon its reinsertion into said casing repositioning said trip latch for engagement with said plate and withdrawing one of said spring dogs from engagement with said plate to permit reëngagement of the portions of said plate with the shoulder of said trip latch, said trip latch during its return to normal position engaging the other of said dogs and withdrawing the same.

17. In a tractor hitch, a casing, a trip latch mounted for oscillation therein embodying a shoulder, an attaching bar arranged adjacent said trip latch provided with a head normally engaging said shoulder, a second shoulder formed on said trip latch, a withdrawable plate mounted within said casing and reciprocal longitudinally thereof and embodying a shoulder engaging against the shoulder of said trip latch to prevent oscillation thereof, two part holding means operable independently of said latch released by the withdrawal of said plate for holding said plate in withdrawn position, the oscillation of said trip latch permitting the withdrawal of said bar from said casing, said bar upon reinsertion into said casing engaging said trip latch and returning the same to normal position and likewise engaging one part of said holding means and withdrawing the same from engagement with said plate, said trip latch during its return to normal position engaging the other part of said holding means and withdrawing it from engagement with said plate.

18. In a tractor hitch, a casing, a member mounted for oscillation within the casing, an attaching bar slidably mounted within said casing and held against movement in one direction by said member and released for movement in said direction when the member is oscillated, a withdrawable plate arranged within said casing and reciprocal therein and adapted to normally engage said member to prevent oscillation thereof, two part means operable independently of said member and released by the withdrawal of said plate for holding said plate in withdrawn position, said bar upon return to normal position engaging said member and returning the same to normal position for reengagement by said plate, said member during its return to normal position engaging one part of said two part means and withdrawing the same from engagement with said plate, said bar during its return to normal position engaging the other part of said two part means and withdrawing the same.

In testimony whereof I hereunto affix my signature.

JOHN K. MILLER.